(12) United States Patent
Spray

(10) Patent No.: US 12,208,690 B1
(45) Date of Patent: Jan. 28, 2025

(54) PROPULSION ASSISTANCE SYSTEM

(71) Applicant: Michael Lee Spray, Washoe Valley, NV (US)

(72) Inventor: Michael Lee Spray, Washoe Valley, NV (US)

( * ) Notice: Subject to any disclaimer, the term of this patent is extended or adjusted under 35 U.S.C. 154(b) by 0 days.

(21) Appl. No.: 18/633,012

(22) Filed: Apr. 11, 2024

(51) Int. Cl.
*B60K 6/10* (2006.01)
*B62M 6/00* (2010.01)
*F16D 55/22* (2006.01)

(52) U.S. Cl.
CPC ............. *B60K 6/10* (2013.01); *B62M 6/00* (2013.01); *F16D 55/22* (2013.01)

(58) Field of Classification Search
CPC ........... B60K 6/10; B62M 6/00; B62M 21/00; B62M 1/105; F16D 55/22; F03G 1/00; F03G 1/02; F03G 1/022; F03G 1/026
See application file for complete search history.

(56) References Cited

U.S. PATENT DOCUMENTS

| | | | | |
|---|---|---|---|---|
| 1,174,454 A * | 3/1916 | Taliaferro | ............. | F03G 1/00 185/43 |
| 1,438,891 A * | 12/1922 | Boggs | ............. | F03G 1/00 185/40 A |
| 1,481,279 A * | 1/1924 | Zippel | ............. | F03G 1/00 185/11 |
| 5,880,532 A * | 3/1999 | Stopher | ............. | B60L 8/00 310/13 |
| 7,473,204 B2 * | 1/2009 | Costello | ............. | B60K 6/10 475/263 |
| 7,673,893 B2 * | 3/2010 | Jan | ............. | B62M 1/105 280/214 |
| 7,834,471 B2 * | 11/2010 | Cripps | ............. | F03G 1/02 290/1 R |
| 8,240,690 B2 * | 8/2012 | Wills | ............. | F16D 41/08 280/214 |
| 10,787,224 B2 | 9/2020 | Howe | | |
| 2023/0399075 A1 * | 12/2023 | Athalye | ............. | F16D 61/00 |
| 2024/0059372 A1 * | 2/2024 | Ljøsne | ............. | B60L 50/20 |

FOREIGN PATENT DOCUMENTS

| | | | |
|---|---|---|---|
| CN | 2184643 Y | * | 12/1994 |
| CN | 1318491 A | * | 10/2001 |
| CN | 2478909 Y | * | 2/2002 |
| CN | 101891003 A | * | 11/2010 |

(Continued)

*Primary Examiner* — Steve Clemmons
(74) *Attorney, Agent, or Firm* — Goodman Law Center, PC

(57) ABSTRACT

A system for assisting propulsion of a vehicle by utilizing stored spring strain energy is disclosed. The propulsion assistance system includes a disc assembly, a caliper and friction brake assembly, a centrifugal clutch assembly, a torsion spring pan assembly, a rear bearing, a shaft, and a front bearing. The caliper and friction brake assembly holds the disc assembly until released, and slowly transfers energy from the torsion spring to the centrifugal clutch assembly, via the shaft. The disc assembly holds the shaft until released by actuating the caliper and friction brake assembly. Release of the friction brake in the caliper and friction brake assembly allows the disc and shaft to turn at variable speeds. Stored strain energy is passed through the shaft to the centrifugal clutch, which engages to assist the drivetrain and convert the strain energy to kinetic energy.

12 Claims, 5 Drawing Sheets

(56) References Cited

FOREIGN PATENT DOCUMENTS

| | | | | |
|---|---|---|---|---|
| CN | 106004820 A | * | 10/2016 | |
| CN | 113697021 A | * | 11/2021 | |
| KR | 200365728 Y1 | * | 10/2004 | |
| KR | 20230099464 A | * | 7/2023 | |
| WO | WO-2010075826 A1 | * | 7/2010 | ............... B60K 6/10 |

* cited by examiner

PROPULSION ASSISTANCE SYSTEM

BACKGROUND

Technical Field of the Disclosure

The present disclosure relates generally to systems for assisting propulsion of vehicles. More particularly, this invention relates to springs that store potential strain energy that can be released and converted to kinetic energy for assistance in propulsion of vehicles.

Description of the Related Art

Conventional vehicles are powered by numerous means such as mechanical, electrical, solar, etc. There are times when additional power is needed to assist in propelling the vehicles. For example, when a bicycle rider is ascending a hill or wants to take a break from pedaling, additional power is needed. Electric vehicles with low power can stall and prevent riders from reaching their destination. Similarly, solar powered vehicles can have low power due to lack of adequate sunlight.

There is thus a need for a propulsion assistance system that solves or ameliorates the problems, defects, and deficiencies of conventional vehicles by utilizing a spring that stores potential strain energy that can be released and converted to kinetic energy for propulsion.

SUMMARY OF THE DISCLOSURE

A preferred embodiment of the propulsion assistance system includes a disc assembly, a caliper and friction brake assembly, a centrifugal clutch assembly, a torsion spring pan assembly, a rear bearing, a shaft, and a front bearing. A housing can surround and enclose the propulsion assistance system. The disc assembly includes a disc providing a smooth surface for the caliper and friction brake assembly to press against and retain a shaft. The caliper and friction brake assembly can be actuated by any means to hold the disc assembly. The caliper and friction brake assembly holds the disc assembly until released (selectively), and slowly transfers energy from the torsion spring to the centrifugal clutch assembly, via the shaft. The disc assembly holds the shaft until released gradually by actuating the caliper and friction brake assembly, thereby enabling the shaft to turn. Release of the friction brake in the caliper and friction brake assembly allows the disc and shaft to turn at variable speeds. The stored strain energy is passed through the shaft to the centrifugal clutch, which engages to assist the drivetrain and convert the strain energy to kinetic energy. The stored strain energy (potential energy) in the torsion spring is transferred and converted to kinetic energy for rotating the shaft.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
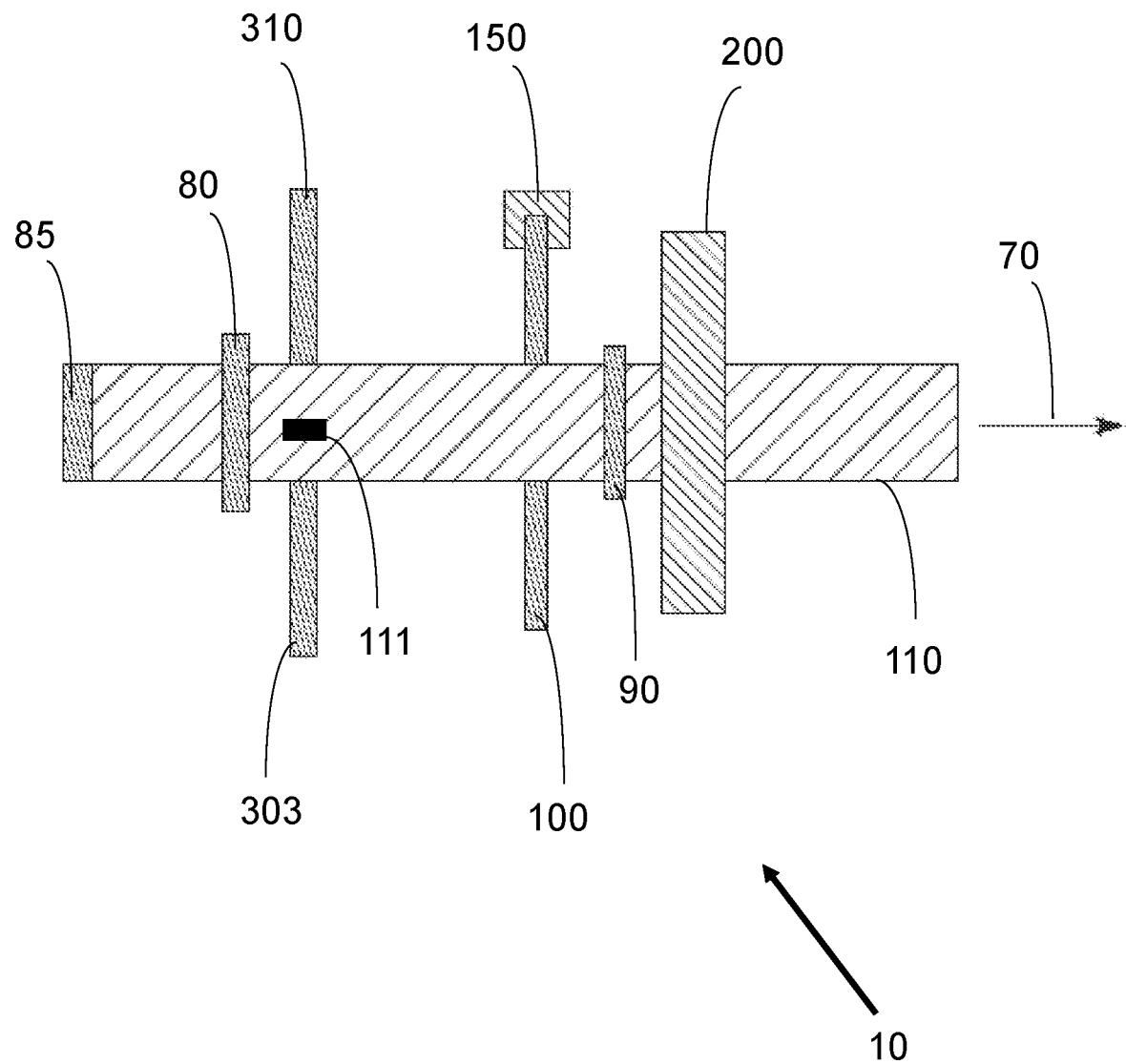
FIG. 1 illustrates a side view of a propulsion assistance system.

Referring to FIG. 1, a side view of a propulsion assistance system 10 is illustrated. The propulsion assistance system 10 includes a disc assembly 100, a caliper and friction brake assembly 150, a centrifugal clutch assembly 200, a torsion spring pan assembly 300, a rear bearing 80, a shaft 110, and a front bearing 90. A first end of the shaft 110 can include a shaft cap 85 as part of a housing. A second end of the shaft 110 faces toward the output 70. A housing can surround and enclose the propulsion assistance system 10. The housing can be made to various configurations to accommodate the system 10 according to manufacturing needs.

Figure 2:
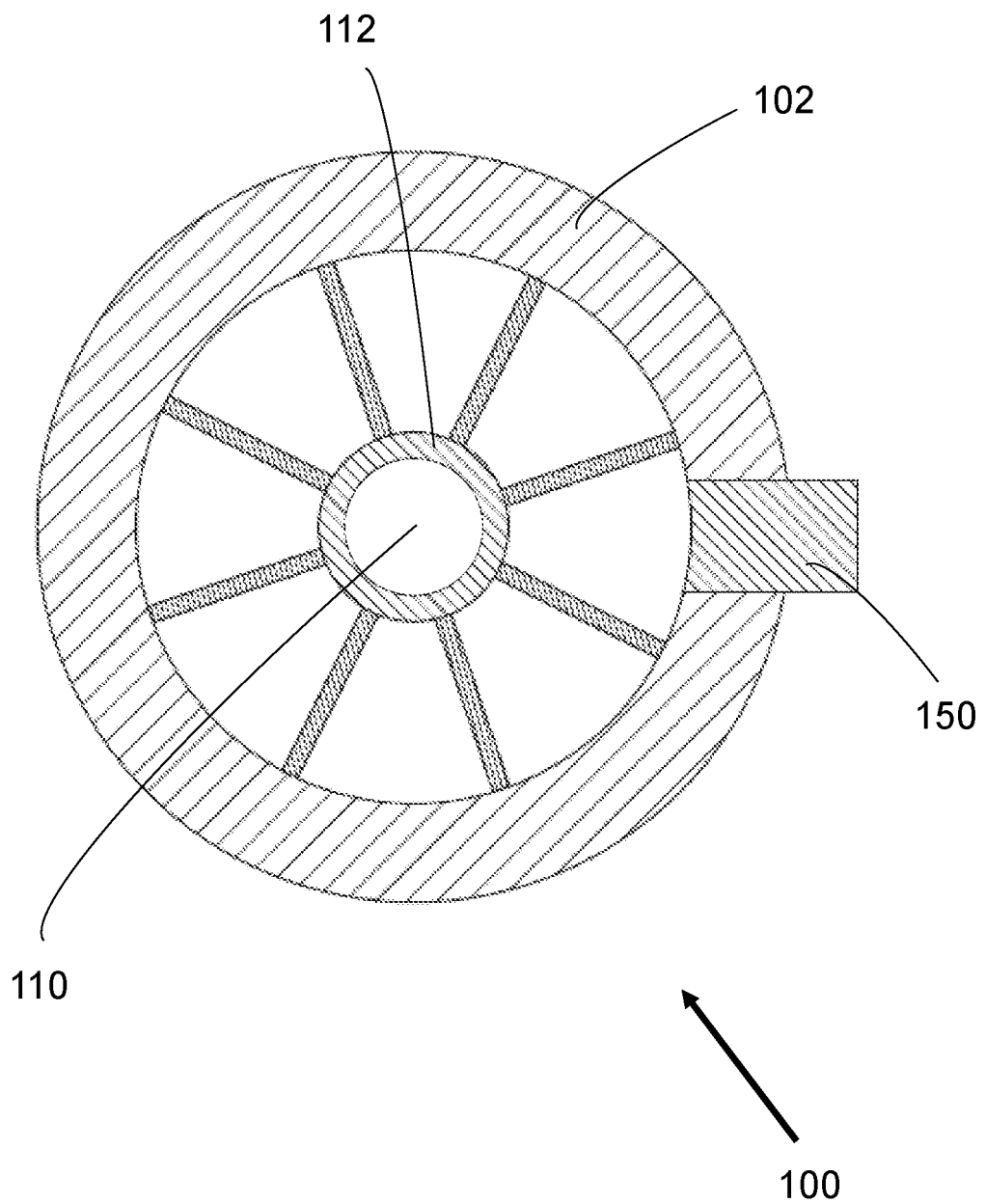
FIG. 2 illustrates a front view of the disc assembly.

Referring to FIG. 2, a front view of the disc assembly 100 is illustrated. The disc assembly 100 includes a disc 102 of any size, made of any material suitable for providing a smooth surface for the caliper and friction brake assembly 150 to press against and retain a shaft 110. The caliper and friction brake assembly 150 can be actuated by any means (e.g. hydraulic, mechanical, electrical, etc.) to hold the disc assembly 100. The caliper and friction brake assembly 150 holds the disc assembly 100 until released (selectively), and slowly transfers energy from the torsion spring 310 to the centrifugal clutch assembly 200, via the shaft 110. Further, the disc assembly 100 can be connected to the shaft 110 by any means. The disc assembly 100 holds the shaft 110 until released gradually by actuating the caliper and friction brake assembly 150, thereby enabling the shaft 110 to turn. Further, the stored strain energy (potential energy) in the torsion spring 310 is transferred and converted to kinetic energy for rotating the shaft 110. The shaft 110 can be any type or size for easy assembly, and conveys energy from the torsion spring pan assembly 300 to the centrifugal clutch assembly 200. The disc assembly 100 can further include a collar 112 surrounding and connected to the shaft 110.

Figure 3:
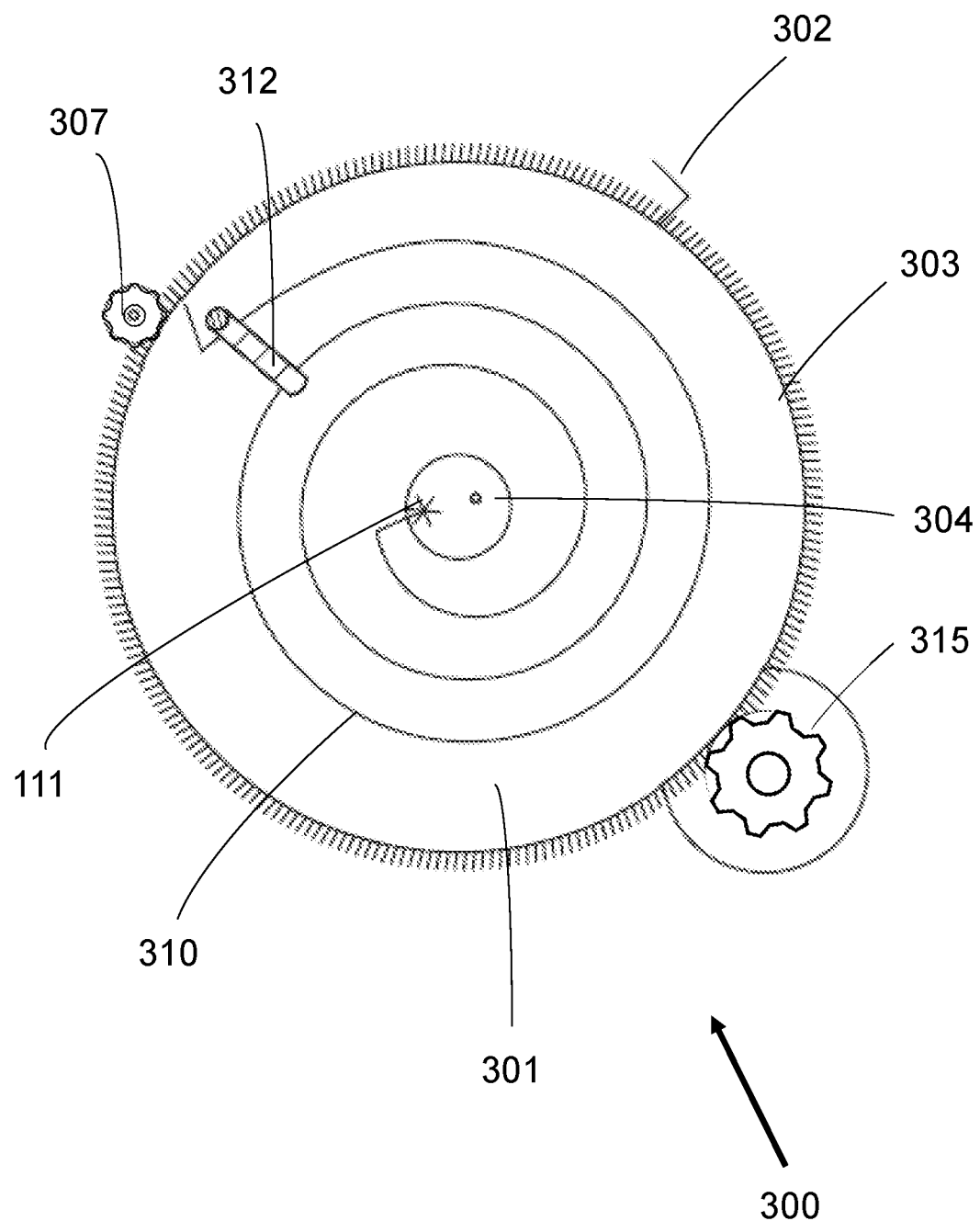
FIG. 3 illustrates a front view of the torsion spring pan assembly.

Referring to FIG. 3, a front view of the torsion spring pan assembly (or "spring assembly") 300 is illustrated. The spring assembly 300 includes a one-way catch 302 that is spring loaded. The one-way catch 302 meshes on the ring gear 303 and allows the torsion spring 310 and pan 301 to turn in a single direction, and keeps tension on the torsion spring 310. In this example, the one-way catch 302 allows the torsion spring 310 and pan to turn in a clockwise direction when actuated. In another embodiment, the one-way catch could allow the torsion spring 310 and pan 301 to turn in a counter-clockwise direction. The spring pan assembly 300 further includes a ring gear 303 connected via a flex plate 304 to the pan enclosing the torsion spring 310. The ring gear 303 and flex plate 304 are connected to the shaft 110 via a bearing of any type. The bearing allows the spring pan assembly 300 to operate independently of the shaft 110. The ring gear 303 and flex plate 304 are connected to the shaft 110 by any mechanical means, enabling the shaft 110 to turn independently from the pan.

The spring pan assembly 300 includes a torsion spring pan 301. The torsion spring pan 301 is a round pan connected to the ring gear 303, and the pan 301 contains a spring loaded metal finger 312 for adding energy to the torsion spring 310. The metal finger 312 connects with the pan 301 and pushes inward to catch the torsion spring 310 to energize and re-energize the spring when engaged (actuated). A flex plate bearing 305 (shown in FIG. 4) can be attached to the shaft 110 in any way to enable the flex plate 304 to rotate independently from the shaft 110. A rear bearing 80 can be attached to the shaft 110 in any way to enable the shaft 110 to rotate freely, while the rear bearing 80 also creates stability and balance for the shaft 110.

Figure 4:
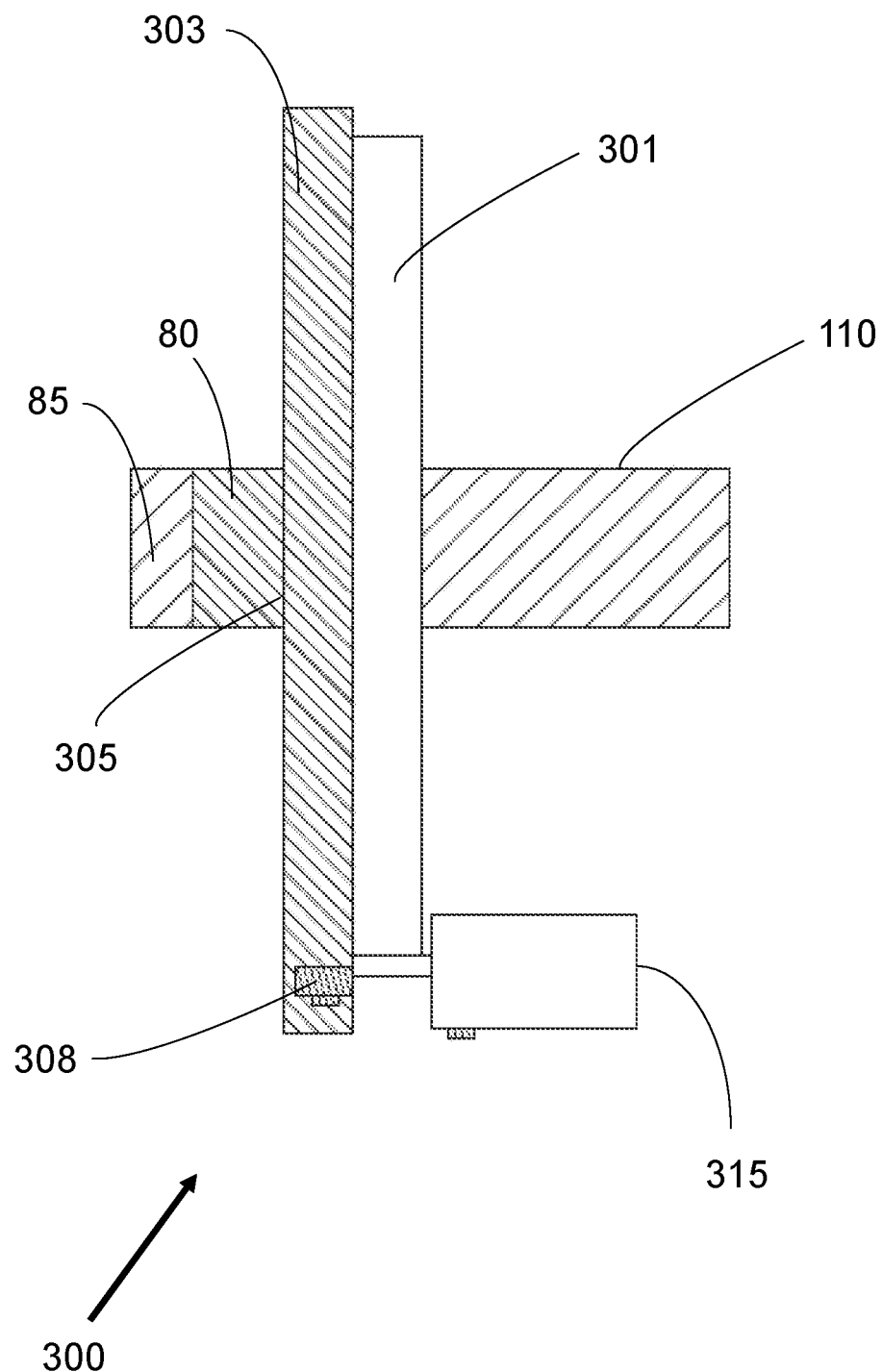
FIG. 4 illustrates a side view of the spring assembly.

Referring to FIG. 4, a side view of the spring assembly 300 is illustrated. The spring pan assembly 300 further includes a motor 315. The motor 315 is a motor with servo that allows for precise control of angular or linear position, speed, and torque. The motor with servo 315 engages the ring gear 303 to energize the torsion spring 310 with a signal received from a sensor. As is well known in the field, a motor with servo 315 can include a motor coupled to a sensor for position feedback and a controller that regulates the motor's movement according to a desired setpoint. The spring assembly 300 also includes an emergency manual crank 307. The manual crank 307 includes a pinion gear 308 on one end inserted through housing to mesh with and engage the ring gear 303. The motor with servo 315 can be powered sympathetically by the electrical system of the propulsion assistance system 10.

Figure 5:
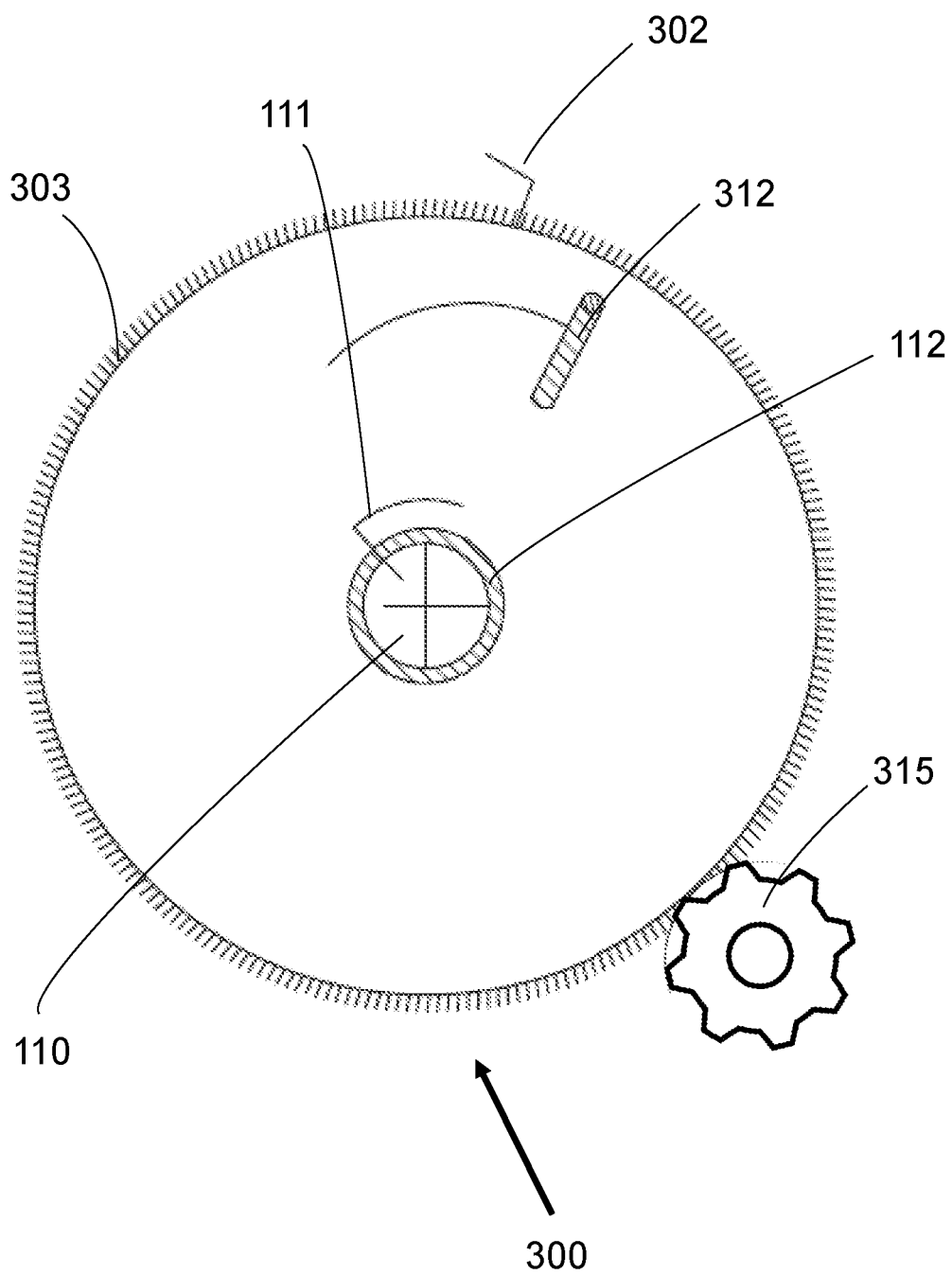
FIG. 5 illustrates an alternate view of the spring assembly.

Referring to FIG. 5, an alternate view of the spring assembly 300 is illustrated. The spring assembly 300 includes a torsion spring 310 used to store strain energy. The torsion spring 310 is a flat spring that serves as an on demand energy source. The torsion spring 310 can be energized and re-energized either sympathetically or manually. One end of the torsion spring 310 is described herein as a "tongue end". A keyway 111 located at one end of the shaft 110 accommodates and connects to the tongue end of the torsion spring 310. A second end of the torsion spring 310 is a free end that is not connected to other components. The spring loaded metal finger 312 inside the pan presses inward to catch the torsion spring 310, and re-energizes the spring when engaged (actuated). Different types of torsion spring 310 with various spring constants can be implemented in the propulsion system 10.

The propulsion assistance system 10 functions by utilizing the aforementioned assemblies and components. The caliper and friction brake assembly 150 can be any size, is mounted independently of the propulsion assistance system 10 and is separate from the disc assembly 100. The disc assembly 100 can be connected by any means to a shaft 110 of any size. The caliper and friction brake assembly 150 holds strain energy created by the torsion spring 310 and transferred to the shaft on the tongue end of the spring. The torsion spring 310 can be energized automatically with a sensor signal transmitted to a direct current ("DC") motor that is used in concert with the torsion spring 310. The DC motor can be powered by sympathetic means from the electrical system of the propulsion assistance system (at large) 10. The torsion spring 310 is energized by applying pressure with a metal finger 312 on an outer end of the torsion spring 310. The metal finger 312 can engage the torsion spring 310 automatically when a sensor signal is received. As the torsion spring 310 wanes, the DC motor engages the ring gear at a pre-determined point, which re-energizes the torsion spring 310. When the torsion spring 310 is energized (and re-energized), it can store strain energy so that the energy can be used on demand.

Further, the release of the friction brake in the caliper and friction brake assembly 150 allows the disc and shaft to turn at variable speeds, wherein the speed depends on the pressure applied. The stored strain energy is passed through the shaft to the centrifugal clutch, which engages to assist the drivetrain and convert the strain energy to kinetic energy. In an emergency event, if a stall occurs, the system 10 can be energized manually by inserting a z-shaped crank with a pinion gear 308 attached. The crank will mesh with the ring gear. When the crank is turned, the torsion spring 310 is re-energized so that the energy can be used on demand.

Embodiments of the propulsion assistance system 10 can be integrated into and operatively connected to vehicles such as bicycles, all-terrain vehicles, electrically powered vehicles, solar powered vehicles, internal combustion engine vehicles, etc. The propulsion assistance system 10 can be connected to vehicle power systems, enabling spring strain energy to convert to kinetic energy and assist the drivetrain in moving the vehicle.

What is claimed is:
1. A propulsion assistance system comprising:
 a) a torsion spring assembly includes a torsion spring and a pan;
 b) the torsion spring is coupled to a shaft;
 c) the pan is configured to add strain energy to the torsion spring automatically;
 d) a disc assembly coupled to the shaft;

e) caliper and friction brake assembly configured to hold the disc assembly and prevent the disc assembly from turning;
f) the caliper and friction brake assembly is configured to selectively release the disc assembly;
g) the disc assembly is configured to convert the strain energy to kinetic energy for rotating the shaft;
h) a ring gear connected to the pan via a flex plate;
i) the ring gear and the flex plate are connected to the shaft via a flex plate bearing;
j) the flex plate bearing is connected to the shaft, enabling the flex plate to rotate independently from the shaft; and
k) the shaft is configured to transfer energy to a centrifugal clutch assembly.

2. The propulsion assistance system of claim 1, wherein the torsion spring assembly further comprises:
a) a one-way catch that is spring loaded, wherein the one-way catch allows the torsion spring and pan to turn in a single direction.

3. The propulsion assistance system of claim 1, wherein the propulsion assistance system is operatively connected to a bicycle.

4. The propulsion assistance system of claim 1, wherein the propulsion assistance system is operatively connected to an electrically powered vehicle.

5. The propulsion assistance system of claim 1, wherein the propulsion assistance system is operatively connected to a solar powered vehicle.

6. The propulsion assistance system of claim 1, wherein the propulsion assistance system is operatively connected to an all-terrain vehicle.

7. The propulsion assistance system of claim 1, wherein the torsion spring assembly further comprises:
c) the pan includes a spring loaded metal finger; and
d) the spring loaded metal finger is configured to engage the torsion spring to energize the torsion spring while engaged.

8. The propulsion assistance system of claim 7, wherein the torsion spring assembly further comprises:
a) a sensor configured to transmit a signal to a motor with servo;
b) the motor with servo is configured to engage the ring gear to energize the torsion spring automatically after receiving the signal from the sensor.

9. The propulsion assistance system of claim 7, wherein the torsion spring assembly further comprises:
a) an emergency manual crank including a pinion gear configured to engage the ring gear and re-energize the torsion spring.

10. A propulsion assistance system comprising:
a) a torsion spring assembly includes a torsion spring and a pan;
b) the torsion spring is coupled to a shaft;
c) the pan is configured to add strain energy to the torsion spring automatically;
d) a disc assembly coupled to the shaft;
e) caliper and friction brake assembly configured to hold the disc assembly and prevent the disc assembly from turning;
f) the caliper and friction brake assembly is configured to selectively release the disc assembly;
g) the disc assembly is configured to convert the strain energy to kinetic energy for rotating the shaft;
h) the shaft is configured to transfer energy to a centrifugal clutch assembly;
i) wherein the torsion spring assembly further comprises: a one-way catch that is spring loaded;
j) wherein the one-way catch allows the torsion spring and pan to turn in a single direction;
k) a ring gear connected to the pan via a flex plate;
l) the ring gear and the flex plate are connected to the shaft via a flex plate bearing;
m) the flex plate bearing is connected to the shaft, enabling the flex plate to rotate independently from the shaft;
n) the pan includes a spring loaded metal finger configured to wind the torsion spring;
o) the spring loaded metal finger is configured to engage the torsion spring to energize the torsion spring while engaged;
p) a sensor configured to transmit a signal to a motor with servo; and
q) the motor with servo is configured to engage the ring gear to re-energize the torsion spring after receiving the signal from the sensor.

11. The propulsion assistance system of claim 10, wherein the torsion spring assembly further comprises: an emergency manual crank including a pinion gear configured to engage the ring gear and re-energize the torsion spring.

12. The propulsion assistance system of claim 10, wherein the torsion spring assembly further comprises:
a) a rear bearing attached to the shaft, enabling the shaft to rotate freely; and
b) wherein the rear bearing further creates stability and balance for the shaft.

* * * * *